Patented May 22, 1934

1,960,170

UNITED STATES PATENT OFFICE 1,960,170

CC - PHENYLETHYL - N - n - PROPYL - BARBITURIC ACID AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application May 18, 1933, Serial No. 671,778. In Germany June 30, 1932

3 Claims. (Cl. 260—33)

The CC-phenylethyl-barbituric acid is often used in the treatment of epilepsy. Its strong narcotic action however impedes its continued administration in frequent doses. The N-methyl-substitution product of this acid, which is already known and which likewise favorably influences epileptic cases, is not as strongly narcotic.

Of other CC-phenylethyl-barbituric acids, N-substituted by the methyl- or ethyl group, the allyl- and benzyl-compounds are likewise already known (German Patent No. 265,726 Example 6; Journal of the American Chemical Society, vol. 51, 1929, p. 316). The N-allyl- and N-benzyl-compounds are unsuited for the treatment of epilepsy.

It has now been found that the therapeutically valuable, heretofore unknown CC-phenylethyl-N-n-propyl-barbituric acid, which surpasses the methyl- and ethyl-compound as regards efficacity, may be obtained by catalytic hydrogenation of the CC-phenylethyl-N-allyl-barbituric acid, which may easily be prepared by allylating CC-phenylethyl-barbituric acid in the presence of copper powder.

The CC-phenylethyl-N-n-propyl-barbituric acid forms beautiful crystals melting at 77–78° C., easily soluble in alkali, likewise easily soluble in the usual organic solvents, such as benzene, alcohol, ether, chloroform, acetone. With acids it may be precipitated from the alkaline solution in unchanged form.

The CC-phenylethyl-N-n-propyl-barbituric acid which, from a technical point of view, is easily prepared according to the process of this invention, may be used in the treatment of epilepsy to the same advantage, as the CC-phenylethyl-N-methyl-barbituric acid recently launched in therapy. It has the same valuable property of being almost entirely without narcotic effect. Compared with CC-phenylethyl-N-methyl-barbituric acid and CC-phenylethyl-N-ethyl-barbituric acid it is greatly less toxic, an advantage of vast importance for medicines which have to be administered in comparatively large doses for a long time.

Administered orally to mice and rabbits for instance, the following doses, given in grams per kilogram bodyweight of the animal, were fixed by experiment:

|  | Mouse | | Rabbit | |
|---|---|---|---|---|
|  | Tolerated | Lethal | Tolerated | Lethal |
| CC-phenylethyl-N-methyl-barbituric acid | 0.25 | 0.50 | 0.20 | 0.30 |
| CC-phenylethyl-N-ethyl-barbituric acid | 0.15 | 0.25 | 0.30 | 0.40 |
| CC-phenylethyl-N-n-propyl-barbituric acid | 0.50 | 1.00 | 0.40 | 0.60 |

This table clearly shows the superior qualities of the propyl compound.

Example 1

100 parts by weight of CC-phenylethyl-N-allyl-barbituric acid are dissolved in 100 parts by weight of methylalcohol and treated with hydrogen under ordinary or slightly increased pressure and at room temperature in the presence of 0.1 part by weight of palladium chloride and 2.5 parts by weight of decolorizing charcoal, the reaction product being adequately agitated. The calculated quantity of hydrogen will have been taken up in less than an hour. From the solution, from which the catalyst has been removed by filtration, and after addition of a little water the CC-phenylethyl-N-n-propyl-barbituric acid crystallizes in beautiful colourless crystals melting at 77–78° C. Allowing for the small quantities, which remain in the mother liquor, but to a great extent may be recovered, the yield is quantitative.

Example 2

To a solution of 100 parts by weight of CC-phenylethyl-N-allyl-barbituric acid in 100 parts by weight of ethylalcohol are added 2 parts by weight of a nickel catalyst obtained in the usual manner; the solution is treated with hydrogen in a closed receptacle at 70° C. and under 10–15 atm. excess-pressure while stirring. After a short time the hydrogenation is completed; the reaction product is obtained from the alcoholic solution in the manner described in Example 1.

I claim:

1. The CC-phenylethyl-N-n-propyl-barbituric acid, which forms beautiful crystals melting at 77–78° C., easily soluble in alkali, likewise easily soluble in the usual organic solvents, such as benzene, alcohol, ether, chloroform, acetone, and which with acids may be precipitated from the alkaline solution in unchanged form.

2. The process for the manufacture of CC-phenylethyl-N-n-propyl-barbituric acid, which consists in treating CC-phenylethyl-N-allyl-barbituric acid with hydrogen in the presence of hydrogenation catalysts.

3. The process for the manufacture of CC-phenylethyl-N-n-propyl-barbituric acid, which consists in treating CC-phenylethyl-N-allyl-barbituric acid with hydrogen in the presence of palladium chloride as catalyst.

O. SCHNIDER.